(12) United States Patent
Zhang et al.

(10) Patent No.: US 11,917,938 B2
(45) Date of Patent: Mar. 5, 2024

(54) METHOD FOR CONSTRUCTING MAP FOR MOWER, STORAGE MEDIUM, MOWER, AND MOBILE TERMINAL

(71) Applicant: Willand (Beijing) Technology Co., Ltd., Beijing (CN)

(72) Inventors: Shaoguang Zhang, Beijing (CN); Degan Lin, Beijing (CN); Zhuo Yao, Beijing (CN)

(73) Assignee: Willand (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 18/346,699

(22) Filed: Jul. 3, 2023

(65) Prior Publication Data

US 2024/0008397 A1    Jan. 11, 2024

(30) Foreign Application Priority Data

Jul. 5, 2022  (CN) .......................... 202210785329.8

(51) Int. Cl.
*A01D 34/00* (2006.01)
*G05D 1/00* (2006.01)

(52) U.S. Cl.
CPC ......... *A01D 34/008* (2013.01); *G05D 1/0274* (2013.01); *G05D 2201/0208* (2013.01)

(58) Field of Classification Search
CPC ............... A01D 34/008; G05D 1/0274; G05D 2201/0208
See application file for complete search history.

(56) References Cited

U.S. PATENT DOCUMENTS 8,428,776 B2    4/2013    Letsky
11,029,691 B1   6/2021    Barboi et al.
(Continued)

FOREIGN PATENT DOCUMENTS

CN    111399502 A    7/2020
CN    112578779 A    3/2021
(Continued)

OTHER PUBLICATIONS

Li Xiu-zhi et al., An autonomous exploration method for an indoor mobile robot, Control and Decision, vol. 34, No. 6, Jun. 2019.
(Continued)

*Primary Examiner* — Donald J Wallace
(74) *Attorney, Agent, or Firm* — Emerson, Thomson & Bennett, LLC; Roger D. Emerson; Jarrett Wyatt

(57) ABSTRACT

A method for constructing a map for a mower includes: acquiring a preliminary map of a work region, two adjacent target points are used as first target points and are connected to form an initial connecting line; selecting a target point farthest from the initial connecting line as a second target point, and using a connecting line between the second target point and the first target points as to-be-processed connecting lines; selecting a third target point for each to-be-processed connecting line; when a condition is met, using connecting lines between the third target point and the target points at the two ends of the to-be-processed connecting line as new to-be-processed connecting lines and returning; retaining each of the third target points whose distance from a corresponding to-be-processed connecting line is greater than the first preset threshold as a map construction target point, and constructing a boundary map.

20 Claims, 5 Drawing Sheets

(56) References Cited

U.S. PATENT DOCUMENTS

| | | | |
|---|---|---|---|
| 11,069,082 B1 | 7/2021 | Afrouzi et al. | |
| 2018/0284806 A1 | 10/2018 | Einecke et al. | |
| 2020/0275604 A1 | 9/2020 | Chen et al. | |
| 2021/0003405 A1* | 1/2021 | Choi | G01S 17/89 |

FOREIGN PATENT DOCUMENTS

| | | |
|---|---|---|
| CN | 112578780 A | 3/2021 |
| CN | 112824937 A | 5/2021 |
| CN | 113110496 A | 7/2021 |
| CN | 114041729 A | 2/2022 |
| CN | 114253266 A | 3/2022 |
| CN | 114265405 A | 4/2022 |
| EP | 3760022 B1 | 11/2021 |
| GB | 01264920 | 1/2002 |
| WO | 03040846 A1 | 5/2003 |
| WO | 2021058032 A1 | 4/2021 |

OTHER PUBLICATIONS

Liu Ruixue, Research on Autonomous Exploration and Mapping Algorithm in Indoor Complex Scenes, China Academic Journal Electronic Publishing House, Information Technology Series, Issue 2, Feb. 2021.

Mohneesh S, 'Applications of Ramer-Douglas-Peucker Algorithm in Machine Learning That You Might Not Have Heard of.' MLearning.ai, published Sep. 20, 2021, [retrieved Sep. 29, 2023], <URL: https://medium.com/ mlearning-ai/applications-of-ramer-douglas-peucker-algorithm-in-machine-learning-that-you-might-not-have-heard-63b0c4f15a43 > [1].

* cited by examiner

METHOD FOR CONSTRUCTING MAP FOR MOWER, STORAGE MEDIUM, MOWER, AND MOBILE TERMINAL

CROSS REFERENCE TO RELATED APPLICATIONS

The present disclosure claims priority to Chinese Application No. 202210785329.8 filed on Jul. 5, 2022, and entitled "METHOD AND APPARATUS FOR CONSTRUCTING A MAP FOR A MOWER, STORAGE MEDIA AND MOWER," all of which are incorporated herein by reference in their entirety.

TECHNICAL FIELD

The present disclosure relates to the technical field of graphics processing, and in particular to, a method for constructing a map for a mower, a storage medium, a mower, and a mobile terminal.

BACKGROUND

In a working process of a mower, the mower needs to construct a map for a work region, and then performs mowing work according to the construct map.

When a map is constructed for an existing mower, wires are buried at a boundary of a work region, and the position of the boundary of the working region is performed by using the mower and wires at the boundary, or the map is constructed by using a lot of position information of the mower at the boundary of the work region. However, the method for constructing a map by burying wires involves a large workload and a complex map construction process; and when a map is constructed based on a lot of position information, good hardware facilities are required to process a lot of data, thereby resulting in high manufacturing costs of the mower.

SUMMARY

In view of the above problems, embodiments of the present disclosure are presented to provide a method for constructing a map for a mower, a storage medium, a mower, and a mobile terminal, so as to at least solve the above problems.

One or more embodiments of the present disclosure provide a method for constructing a map for a mower, including: acquiring a preliminary map of a work region of the mower, where the preliminary map includes a plurality of target points collected by the mower; selecting any two adjacent target points in the preliminary map as first target points, connecting the first target points to form an initial connecting line, selecting a target point farthest from the initial connecting line as a second target point, where a distance between the target point and the initial connecting line is a smallest distance among distances between each point on the initial connecting line and the target point; and using connecting lines between the second target point and the first target points as to-be-processed connecting lines; selecting, for each of the to-be-processed connecting lines, a target point that is located between two ends of the to-be-processed connecting line and is farthest from the to-be-processed connecting line as a third target point; using, in response to a distance between the third target point and the to-be-processed connecting line being greater than a first preset threshold, connecting lines between the third target point and the target points at the two ends of the to-be-processed connecting line as new to-be-processed connecting lines; returning to perform the operation of selecting, for each of the to-be-processed connecting lines, a target point that is located between two ends of the to-be-processed connecting line and is farthest from the to-be-processed connecting line as a third target point, until a distance between the selected third target point and the to-be-processed connecting line is less than or equal to the first preset threshold; retaining each of the third target points whose distance from a corresponding to-be-processed connecting line is greater than the first preset threshold as a map construction target point, where the distance between the third target point and the to-be-processed connecting line is a smallest distance among distances between each point on the to-be-processed connecting line and the third target point; and constructing a boundary map of the work region of the mower based on the map construction target point, the first target points, and the second target point.

In one implementation, the acquiring the preliminary map of the work region of the mower includes: controlling the mower to move along a boundary of the work region; and collecting current position information of the mower according to a preset frequency, to generate the preliminary map.

In one implementation, the until the distance between the selected third target point and the to-be-processed connecting line is less than or equal to the first preset threshold, and retaining each of the third target points whose distance from the corresponding to-be-processed connecting line is greater than the first preset threshold as the map construction target point further includes: eliminating, in response to the distance between the third target point and the to-be-processed connecting line being less than or equal to the first preset threshold, target points except for the map construction target point, the first target points, and the second target point.

In one implementation, the controlling the mower to move along the boundary of the work region includes: determining the boundary of the work region according to a body sensor of the mower; and controlling the mower to move according to the boundary of the work region.

According to another aspect of the present disclosure, a non-transitory computer-readable storage medium storing computer instructions is provided, where the computer instructions are used for causing a computer to perform the method in the above aspects.

According to another aspect of the present disclosure, a mower is provided, including: a body, a cutterhead, and a driving wheel; one or more processors; and a memory storing a program; where the program includes instructions, and the instructions, when executed by the processor, cause the processor to perform the method in the above aspects.

According to another aspect of the present disclosure, a mobile terminal is provided, including: one or more processors; and a memory storing a program; where a mobile terminal receives a preliminary map of a work region of a mower, and the program, when executed by the processor, causes the processor to perform the method in the above aspects, to construct a boundary map of the work region of the mower; and send the boundary map of the work region to the mower.

According to another aspect of the present disclosure, an electronic device is provided, including: one or more processors; and a memory storing a program; where the program includes instructions, and the instructions, when executed by the processor, cause the processor to perform the method in the above aspects.

The method for constructing a map for a mower, the storage medium, the mower, and the mobile terminal are provided in the present disclosure. A preliminary map of a work region of the mower is acquired, where the preliminary map includes a plurality of target points collected by the mower. Any two adjacent target points in the preliminary map is selected as first target points, the first target points are connected to form an initial connecting line, and a target point farthest from the initial connecting line is selected as a second target point, where a distance between the target point and the initial connecting line is a smallest distance among distances between each point on the initial connecting line and the target point. Connecting lines between the second target point and the first target points is used as to-be-processed connecting lines. For each of the to-be-processed connecting lines, a target point is located between two ends of the to-be-processed connecting line and is farthest from the to-be-processed connecting line is selected as a third target point. In response to a distance between the third target point and the to-be-processed connecting line being greater than a first preset threshold, connecting lines between the third target point and the target points at the two ends of the to-be-processed connecting line are used as a new to-be-processed connecting line; return to continue performing the operation of selecting, for each of the to-be-processed connecting lines, a target point that is located between two ends of the to-be-processed connecting line and is farthest from the to-be-processed connecting line as a third target point, until a distance between the selected third target point and the to-be-processed connecting line is less than or equal to the first preset threshold. Each of the third target points whose distance from a corresponding to-be-processed connecting lines is greater than the first preset threshold is retained as a map construction target point, where the distance between the third target point and the to-be-processed connecting line is a smallest distance among distances between each point on the to-be-processed connecting line and the third target point. A boundary map of the work region of the mower is constructed based on the map construction target point, the first target points, and the second target point. The method for constructing a map in the present disclosure avoids complex map construction by burying wires, and thus is more convenient and efficient. Moreover, the preliminary map is processed, thereby reducing data computing workload for final map construction, and reducing the manufacturing costs of the mower.

BRIEF DESCRIPTION OF THE DRAWINGS

To more clearly describe technical schemes of embodiments of the present disclosure or existing technologies, drawings to be used in the description of the embodiments or the existing technologies will be briefly introduced below. Apparently, the drawings described below are some embodiments of the present disclosure. For those of ordinary skills in the art, other drawings may also be obtained based on these drawings without making creative work.

DESCRIPTION OF REFERENCE NUMERALS

500: Apparatus for constructing a map for a mower; 501: collection module; 502: processing module; 503: map generation module; 600: electronic device; 601: computing unit; 602: ROM; 603: RAM; 604: bus; 605: input/output interface; 606: input unit; 607: output unit; 608: storage unit; and 609: communication unit.

DETAILED DESCRIPTION OF EMBODIMENTS

To enable those in the present technical field to better understand schemes of the present disclosure, technical schemes of embodiments of the present disclosure will be clearly and completely described below with reference to the drawings in the embodiments of the present disclosure. Apparently, the described embodiments are some embodiments, instead of all embodiments, of the present disclosure. All other embodiments obtained by those of ordinary skills in the art based on the embodiments of the present disclosure without making creative work are encompassed within the scope of protection of the present disclosure.

In order to facilitate understanding, before specific embodiments of the present disclosure are described in detail, an application scenario of a method for constructing a map for a mower, an apparatus for constructing a map for a mower, a storage medium, and a mower in the present disclosure will be first illustrated.

In a working process of a mower, it is necessary to first construct a map for a work region, and then mow grass according to the constructed map.

When a map is constructed for an existing mower, wires are buried at a boundary of a work region, the boundary of the work region is positioned by using the mower and the wires at the boundary, or the map is constructed by using a lot of position information of the mower at the boundary of the work region. However, the method for constructing a map by burying wires involves a large workload and a complex map construction process; and when a map is constructed based on a lot of position information, good hardware facilities are required to process a lot of data, thereby resulting in high manufacturing costs of the mower. In view of this, the present disclosure presents a method for constructing a map for a mower, an apparatus for constructing a map for a mower, a storage medium, and a mower, so as to solve problems existing in the above existing technology.

It should be noted that the method for constructing a map for a mower in the embodiments of the present disclosure may be applied to a mower side, or may be implemented by multi-end interaction and cooperation, where the multi-terminal may include a mower side, a mobile electronic device side, and a cloud server.

The specific embodiments of the present disclosure will be described in detail below with reference to the drawings.

Figure 1:
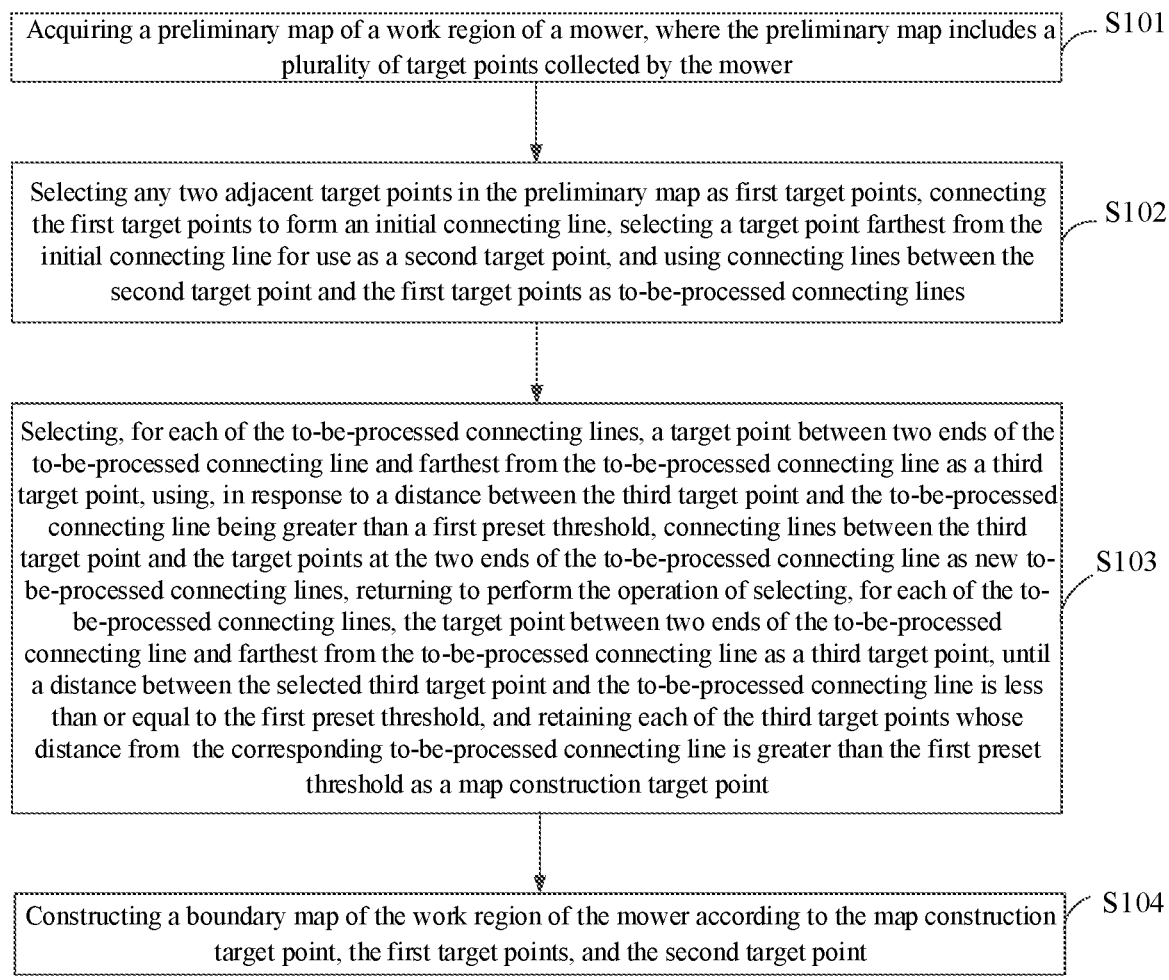
FIG. 1 is a schematic flowchart of a method for constructing a map for a mower in an example embodiment of the present disclosure.

FIG. 1 is a schematic flowchart of a method for constructing a map for a mower in an example embodiment of the present disclosure. As shown in the figure, the present embodiment mainly includes steps of:

S101: acquiring a preliminary map of a work region of the mower.

For example, the preliminary map includes a plurality of target points collected by the mower. The mower can be controlled to move along an edge of the work region, and position information of the mower is collected to generate the preliminary map, or the preliminary map can be acquired by directly acquiring a preliminary map stored in a cloud server or the mower, which is not limited in the present embodiment.

S102: using two adjacent target points in the preliminary map as two first target points, connecting the first target points to form an initial connecting line, selecting a target point farthest from the initial connecting line of the first target points as a second target point, and using connecting lines between the second target point and the first target points as to-be-processed connecting lines.

Figure 4A:
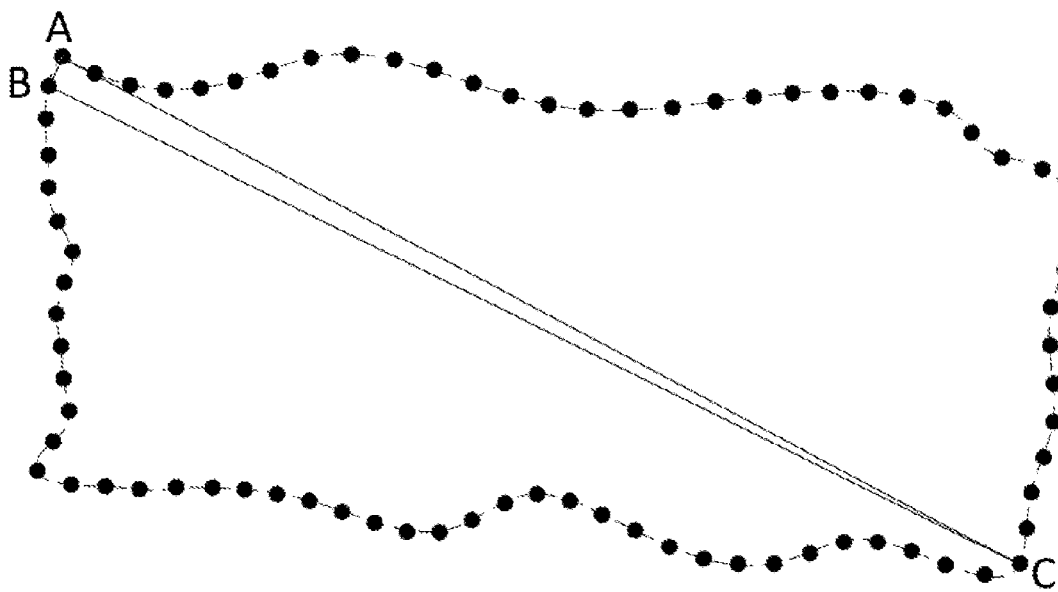
FIG. 4A to FIG. 4E are schematic flowcharts of the method for constructing a map for a mower in an example embodiment of the present disclosure.

For example, referring to FIG. 4A, a distance between the target point and the initial connecting line is a smallest distance among distances between each point on the initial connecting line and the target point. Similarly, a distance between the target point and a to-be-processed connecting line below is a smallest distance among distances between each point on the to-be-processed connecting line and the target point. Any two adjacent target points A and B in the preliminary map of the mower are used as the first target points, and the first target point A and the first target point B are connected to form an initial connecting line AB. Among the target points except for the first target point A and the first target point B, a target point farthest from the connecting line AB is selected as a second target point C. The second target point C is connected with the first target point A and the first target point B to form a to-be-processed connecting line AC and a to-be-processed connecting line BC.

S103: selecting, for each of the to-be-processed connecting lines, a target point that is located between two ends of the to-be-processed connecting line and is farthest from the to-be-processed connecting line as a third target point, using, in response to a distance between the third target point and the to-be-processed connecting line being greater than a first preset threshold, connecting lines between the third target point and the target points at the two ends of the to-be-processed connecting line as new to-be-processed connecting lines, returning to continue performing the selecting, for each of the to-be-processed connecting lines, the target point that is located between two ends of the to-be-processed connecting line and is farthest from the to-be-processed connecting line as a third target point, until a distance between the selected third target point and the to-be-processed connecting line is less than or equal to the first preset threshold, and retaining each of the third target points whose distance from a corresponding to-be-processed connecting lines is greater than the first preset threshold as a map construction target point.

It should be noted that the distance between the third target point and the to-be-processed connecting line is a smallest distance among distances between each point on the to-be-processed connecting line and the third target point.

Figure 4B:
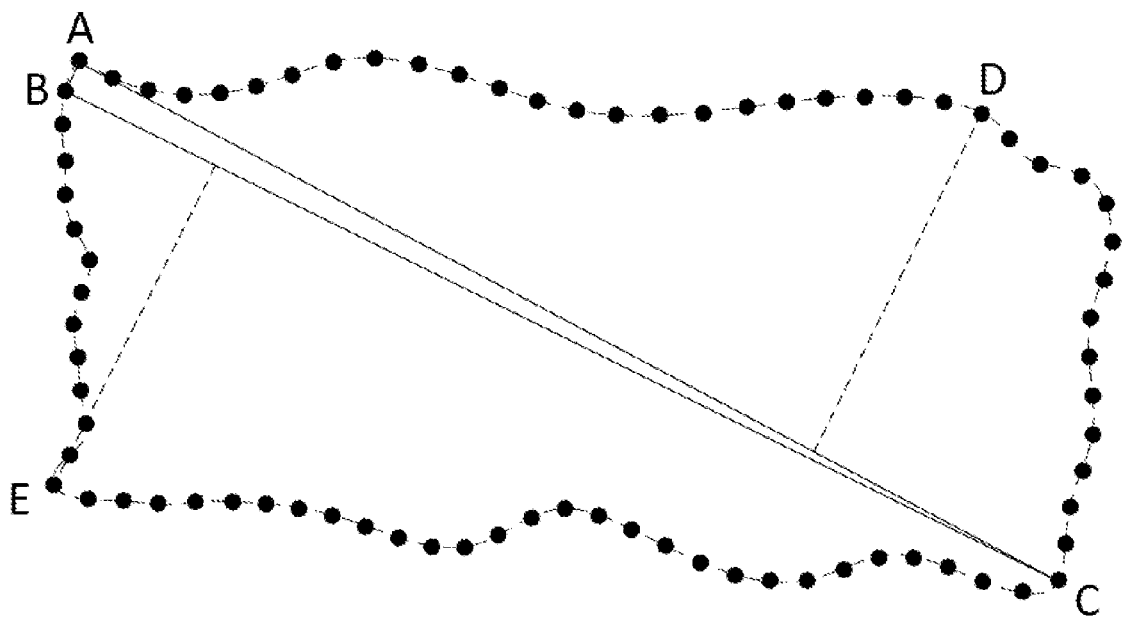
Figure 4C:
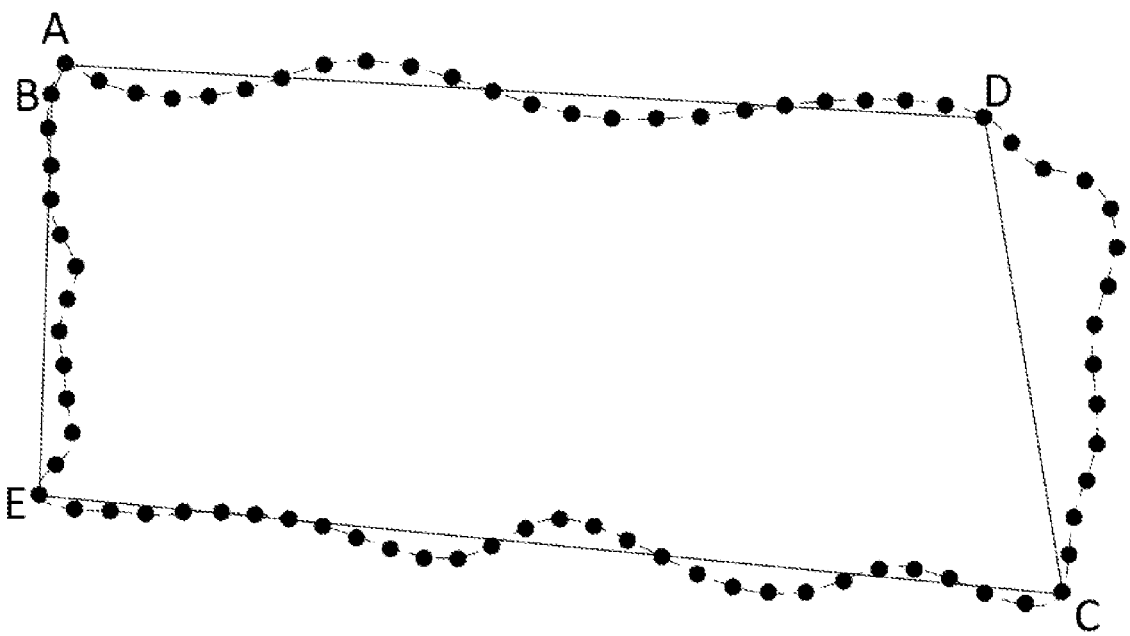

For example, referring to FIG. 4B and FIG. 4C, a third target point D is searched between the first target point A and the second target point C at both ends of the to-be-processed connecting line AC, and the third target point D is a point farthest from the to-be-processed connecting line AC. A distance between the third target point D and the to-be-processed connecting line AC is compared with the first preset threshold. when the distance between the third target point D and the to-be-processed connecting line AC is greater than the first preset threshold, a connecting line AD between the third target point D and the target point A of the to-be-processed connecting line AC and a connecting line CD between the third target point D and the target point C of the to-be-processed connecting line AC are both used as new to-be-processed connecting lines, and the to-be-processed connecting line AC is eliminated.

Similarly, a third target point E is searched between the first target point B and the second target point C at both ends of the to-be-processed connecting line BC, and the third target point E is a point farthest from the to-be-processed connecting line BC. A distance between the third target point E and the to-be-processed connecting line BC is compared with the first preset threshold. When the distance between the third target point E and the to-be-processed connecting line BC is greater than the first preset threshold, a connecting line BE between the third target point E and the target point B of the to-be-processed connecting line BC and a connecting line CE between the third target point E and the target point C of the to-be-processed connecting line BC are both used as new to-be-processed connecting lines, and the to-be-processed connecting line BC is eliminated.

Figure 4D:
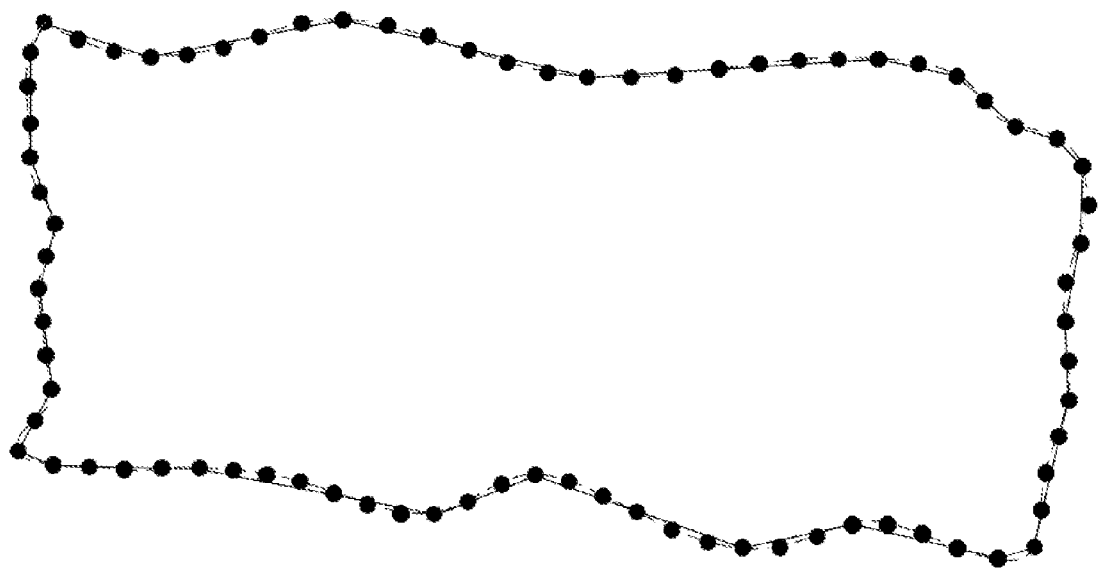

For example, referring to FIG. 4D, the above steps are repeated until the distance between the selected third target point and the to-be-processed connecting line is less than or equal to the first preset threshold, and each of the third target points whose distance from the corresponding to-be-processed connecting lines is greater than the first preset threshold is retained as the map construction target point.

It should be noted that setting of the first preset threshold has great influence on an error between the finally constructed boundary map in the present embodiment and a boundary of an actual work region. Thus, the first preset threshold can be experimentally obtained, so as to avoid a phenomenon that, for example, the distance between the third target point D and the to-be-processed connecting line AC is less than or equal to the first preset threshold, thus avoiding a large error between the finally constructed boundary map and the boundary of the actual work region.

In a specific implementation, when the distance between the third target point and the to-be-processed connecting line is less than or equal to the first preset threshold, target points except for the map construction target point, the first target points, and the second target point are eliminated.

For example, referring to FIG. 4B, if the distance between the third target point D and the to-be-processed connecting line AC is less than or equal to the first preset threshold, a target point between the first target point A and the second target point C is eliminated, and the first target point A and the second target point C are retained; similarly, if the distance between the third target point E and the to-be-processed connecting line BC is less than or equal to the first preset threshold, a target point between the first target point B and the second target point C is eliminated, and the first target point B and the second target point C are retained.

This implementation can reduce the number of target points for constructing the boundary map of the work region of the mower, thereby reducing the data computing workload for constructing the boundary map of the work region.

S104: Constructing a boundary map of the work region of the mower based on the map construction target point, the first target points, and the second target point.

For example, referring to FIG. 4D, the boundary map of the work region of the mower is constructed based on the map construction target point, the first target points, and the second target point.

It should be noted that the constructed boundary map of the work region may be stored in a RAM or ROM of the mower, or may be sent to a mobile terminal or a cloud server for storage, which is not limited in the present disclosure.

The above embodiments avoid complex map construction by burying wires and the workload for burying wires, and are more convenient and efficient. Moreover, the above embodiments process the preliminary map, thereby reducing data computing workload for finally constructing the boundary map of the work region, and reducing the manufacturing costs of the mower.

Figure 2:
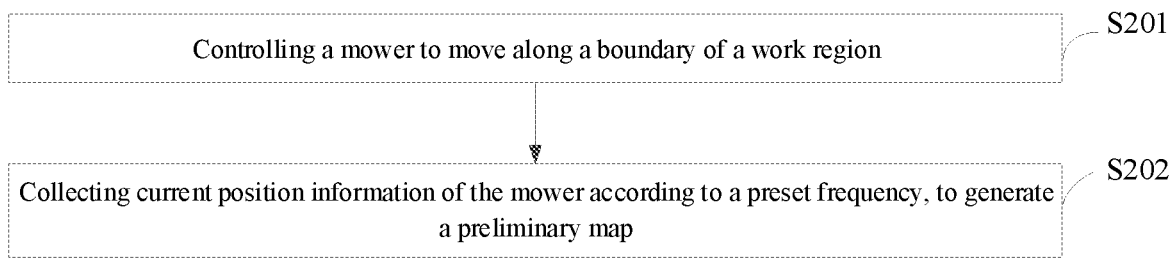
FIG. 2 is a schematic flowchart of the method for constructing a map for a mower in another embodiment of the present disclosure.

FIG. 2 is a schematic flowchart of a method for constructing a map for a mower in another example embodiment of the present disclosure. The present embodiment mainly shows an optional implementation scheme of the above step S101. As show in the figure, the present embodiment mainly includes steps of:

S201: controlling the mower to move along a boundary of a work region.

S202: collecting current position information of the mower according to a preset frequency, to generate a preliminary map.

For example, the mower may be controlled using a mobile terminal to move along the boundary of the work region. The preset frequency may be such that the current position information of the mower is collected once every 0.1 second. The current position information of the mower may be collected by, e.g., GPS, RTK, or visual positioning, and may be global position information, or may be relative position information. In the present embodiment, the mower is controlled to collect position information to acquire the preliminary map, thereby avoiding acquiring the preliminary map by, e.g., burying wires, reducing the workload, and improving the efficiency of acquiring the preliminary map.

In a specific implementation, the boundary of the work region may be further determined according to a body sensor of the mower, e.g., a visual sensor; and the mower may be controlled to move according to the boundary of the work region acquired by the visual sensor. Through this implementation, the mower can autonomously move to collect the current position information without manual control, such that the operation mode is more convenient.

It should be noted that, in addition to acquiring the preliminary map by controlling the mower to collect the position information in the present embodiment, the preliminary map may be acquired by acquiring the preliminary map stored in the cloud server or the mower. The preliminary map may be processed through the steps S101-S103 in the above embodiments, to obtain the map construction target point, and then boundary map of the work region of the mower is constructed based on the map construction target point, the first target points, and the second target point.

Figure 3:
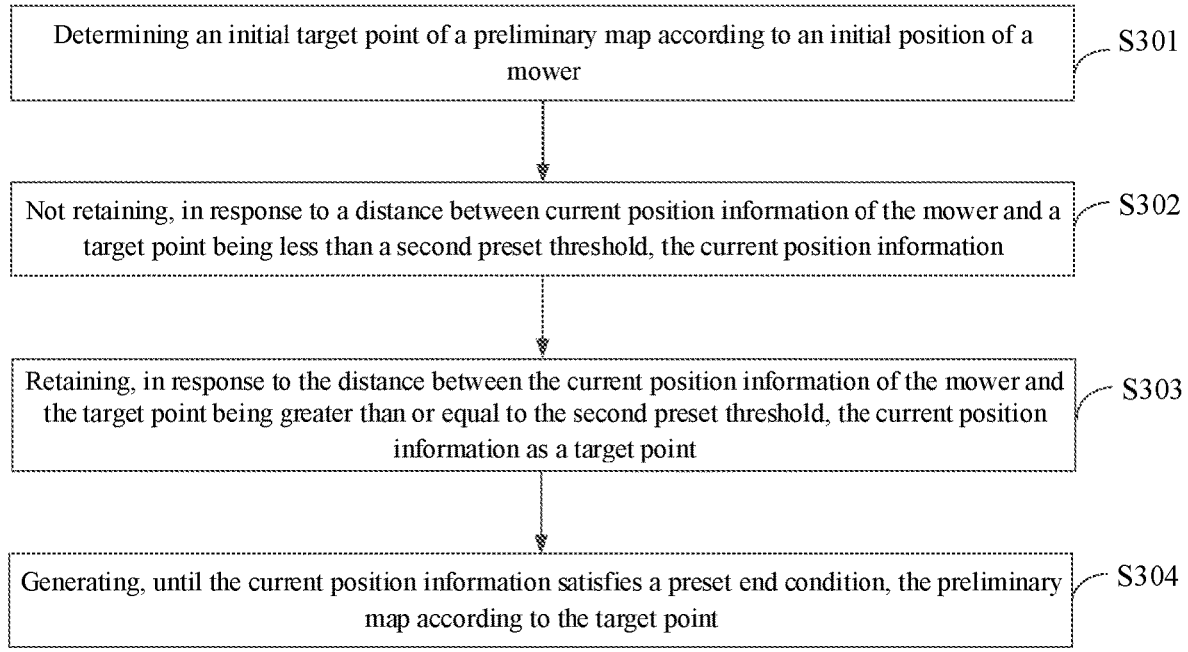
FIG. 3 is a schematic flowchart of the method for constructing a map for a mower in another embodiment of the present disclosure.

FIG. 3 is a schematic flowchart of a method for constructing a map for a mower in another example embodiment of the present disclosure. The present embodiment mainly shows a specific implementation scheme of the above step S202. As show in the figure, the present embodiment mainly includes steps of:

S301: determining an initial target point of a preliminary map according to an initial position of a mower.

Figure 4E:
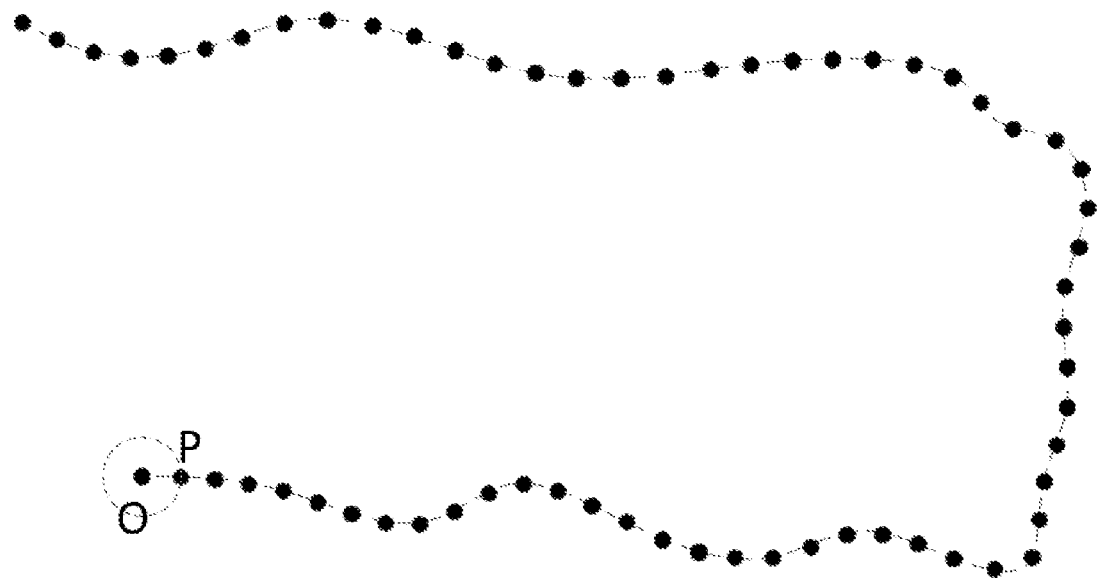

For example, referring to FIG. 4E, the initial position of the mower is a point O, and the initial target point of the preliminary map may be determined to be the point O.

S302: not retaining, in response to a distance between current position information of the mower and a target point being less than a second preset threshold, the current position information.

For example, if the current position information of the mower is a point P, it is determined whether a distance between the point P and the target point O is less than the second preset threshold. For example, the second preset threshold is a radius of a dotted circle in FIG. 4E. If the distance between the point P and the target point O is less than the second preset threshold, information of the point P is discarded.

S303: retaining, in response to the distance between the current position information of the mower and the target point being greater than or equal to the second preset threshold, the current position information as a target point.

For example, if the distance between the point P and the target point O is greater than or equal to the second preset threshold, the point P is retained as the target point.

S304: generating, until the current position information satisfies a preset end condition, the preliminary map according to the target point.

For example, the above steps S302 and S303 are repeated, until the current position information satisfies the preset end condition, the preliminary map is generated according to all retained target points.

With this embodiment, excessive data processing workload of the preliminary map due to too many target points of the preliminary map can be avoided, thus reducing the data computing workload for final construction of the boundary map of the work region, reducing performance requirements for hardware of the mower, and thus reducing manufacturing costs of the mower.

In a specific implementation, if a distance between the current position information of the mower and the initial position is less than the second preset threshold, the current position information is determined to satisfy the preset end condition. Through this implementation, the distance from a first coordinate point in the preliminary map can be ensured to be less than the second preset threshold, and thus avoiding overlapping parts in the preliminary map, which affects subsequent processing.

Figure 5:
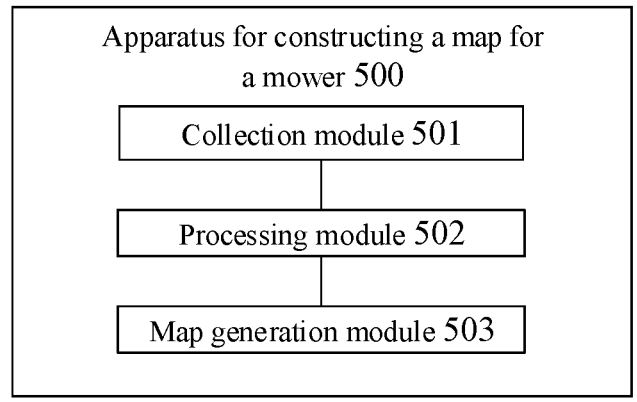
FIG. 5 is a structural block diagram of an apparatus for constructing a map for a mower in an example embodiment of the present disclosure.

FIG. 5 is a structural block diagram of an apparatus for constructing a map for a mower in an example embodiment of the present disclosure.

The apparatus 500 for constructing a map for a mower in the present embodiment may be installed in a mower, where the mower may be adapted to performing a task of constructing a map for a mower.

As shown in the figure, the apparatus 500 for constructing a map for a mower in the present embodiment mainly includes: a collection module 501, a processing module 502, and a map generation module 503.

The collection module 501 is configured to acquire a preliminary map of a work region of the mower, where the preliminary map includes a plurality of target points collected by the mower.

The processing module 502 is configured to select any two adjacent target points in the preliminary map as first target points, connect the first target points to form an initial connecting line, select a target point farthest from the initial connecting line as a second target point, where a distance between the target point and the initial connecting line is a smallest distance among distances between each point on the initial connecting line and the target point; use connecting lines between the second target point and the first target points as to-be-processed connecting lines; select, for each of the to-be-processed connecting lines, a target point that is located between two ends of the to-be-processed connecting line and is farthest from the to-be-processed connecting line as a third target point; use, in response to a distance between the third target point and the to-be-processed connecting line being greater than a first preset threshold, connecting lines between the third target point and the target points at the two ends of the to-be-processed connecting line as new to-be-processed connecting lines; return to continue performing the selecting a target point that is located between two ends of the to-be-processed connecting line and is farthest from the to-be-processed connecting line as a third target point, until a distance between the selected third target point and the to-be-processed connecting line is less than or equal to the first preset threshold; retain each of the third target points whose distance from the corresponding to-be-processed connecting lines is greater than the first preset threshold as a target point map construction, where the distance between the third target point and the to-be-processed connecting line is a smallest distance among distances between each point on the to-be-processed connecting line and the third target point.

The map generation module 503 is configured to construct a boundary map of the work region of the mower based on the map construction target point, the first target points, and the second target point.

In addition, the apparatus 500 for constructing a map for a mower in an embodiment of the present disclosure may be further configured to implement other steps of the method for constructing a map for a mower in the above embodiments, and has the beneficial effects of the corresponding steps of the method in the embodiments, which will not be repeated here.

An example embodiment of the present disclosure further provides a non-transitory computer-readable storage medium storing computer instructions, where the computer instructions are used for causing a computer to perform the method in the embodiments of the present disclosure.

An example embodiment of the present disclosure further provides a computer program product, including a computer program, where the computer program, when executed by a processor of a computer, causes the computer to perform the method in the embodiments of the present disclosure.

An example embodiment of the present disclosure further provides a mower, including: a body, a cutterhead, and a driving wheel; one or more processors; and a memory storing a program; where the program includes instructions, and the instructions, when executed by the processor, cause the processor to perform the method in the embodiments of the present disclosure.

An example embodiment of the present disclosure further provides a mobile terminal, including: one or more processors; and a memory storing a program; where the mobile terminal receives a preliminary map of a work region of a mower, and the program, when executed by the processor, causes the processor to perform the method in the above embodiments, to construct a boundary map of the work region of the mower; and send the boundary map of the work region to the mower.

Specifically, the mobile terminal can receive a preliminary map stored in the mower or a cloud server, perform the method in the above embodiments to construct the boundary map of the work region of the mower, and then send the boundary map of the work region to the mower.

Similarly, the cloud server can receive the preliminary map, and process the boundary map by using the method in the above embodiments to construct the boundary map of the work region of the mower, and then send the boundary map of the work region to the mower.

An example embodiment of the present disclosure further provides an electronic device, including: one or more processors; and a memory storing a program; where the program includes instructions, and the instructions, when executed by the processor, cause the processor to perform the method in the embodiments of the present disclosure.

Figure 6:
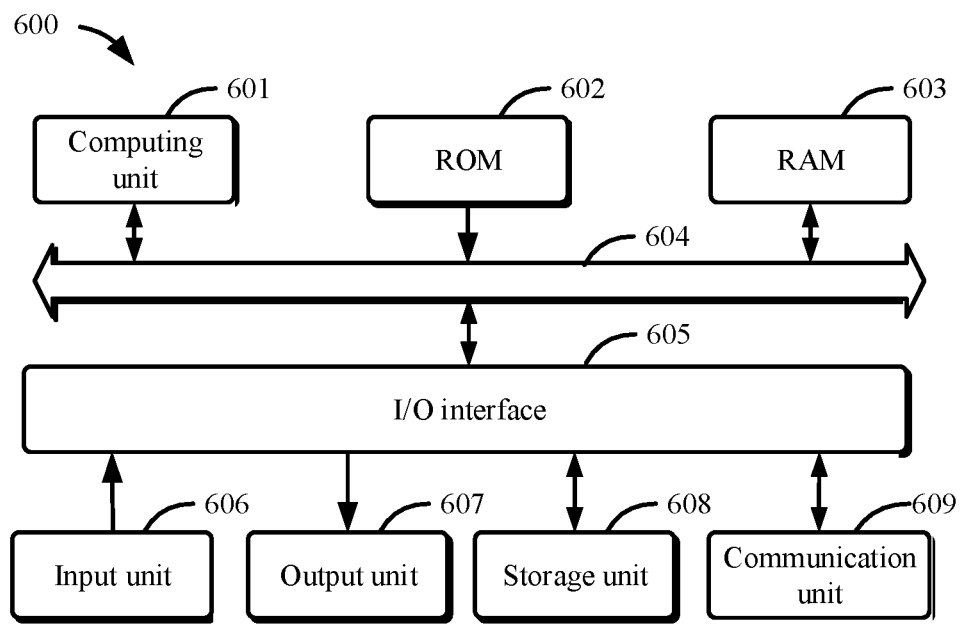
FIG. 6 is a structural block diagram of an electronic device in an example embodiment of the present disclosure.

Referring to FIG. 6, a structural block diagram of an electronic device 600 that can serve as a server or a client of the present disclosure will now be described, which is an example of a hardware device that can be applied to various aspects of the present disclosure. The electronic device is intended to represent various forms of electronic digital computing devices, such as a laptop computer, a desktop computer, a workbench, a personal digital assistant, a server, a blade server, a mainframe computer, and other suitable computers. The electronic device may further represent various forms of mobile apparatuses, such as a personal digital assistant, a cellular phone, a smart phone, a wearable device, and other similar computing apparatuses. The components shown herein, the connections and relationships thereof, and the functions thereof are merely used as examples, and are not intended to limit implementations of the present disclosure described and/or claimed herein.

As shown in FIG. 6, the electronic device 600 includes a computing unit 601, which may execute various appropriate actions and processes in accordance with a computer program stored in a read-only memory (ROM) 602 or a computer program loaded into a random-access memory (RAM) 603 from a storage unit 608. The RAM 603 may further store various programs and data required by operations of the device 600. The computing unit 601, the ROM 602, and the RAM 603 are connected to each other through a bus 604. An input/output (I/O) interface 605 is also connected to the bus 604.

A plurality of components in the electronic device 600 is connected to the I/O interface 605, including: an input unit 606, an output unit 607, a storage unit 608, and a communication unit 609. The input unit 606 may be any type of device capable of inputting information into the electronic device 600, and the input unit 606 may receive inputted digital information or character information, and generate key signal input related to user settings and/or function control of the electronic device. The output unit 607 may be any type of device capable of presenting information, and may include, but is not limited to, a display, a speaker, a video/audio output terminal, a vibrator, and/or a printer. The storage unit 604 may include, but is not limited to, a magnetic disk and an optical disk. The communication unit 609 allows the electronic device 600 to exchange information/data with other devices through a computer network such as the Internet and/or various telecommunication networks, and may include, but is not limited to, a modem, a network card, an infrared communication device, a wireless communication transceiver and/or a chipset, such as a Bluetooth™ device, a WiFi device, a WiMax device, a cellular communication device, and/or an analog.

The computing unit 601 may be various general-purpose and/or special-purpose processing components having a processing power and a computing power. Some examples of the computing unit 601 include, but are not limited to, a central processing unit (CPU), a graphics processing unit (GPU), various special-purpose artificial intelligence (AI)

computing chips, various computing units running a machine learning model algorithm, a digital signal processor (DSP), and any appropriate processor, controller, microcontroller, and the like. The computing unit 601 executes various methods and processes described above. For example, in some embodiments, the method for constructing a map for a mower in the above embodiments may be implemented as a computer software program that is tangibly included in a machine-readable medium, such as the storage unit 608. In some embodiments, some or all of the computer programs may be loaded and/or installed onto the electronic device 600 via the ROM 602 and/or the communication unit 609. In some embodiments, the computing unit 601 may be configured to perform the method for constructing a map for a mower by any other appropriate approach (e.g., by means of firmware).

Program codes for implementing the method of the present disclosure may be compiled using any combination of one or more programming languages. The program codes may be provided to a processor or controller of a general-purpose computer, a special-purpose computer, or other programmable data processing apparatuses, such that the program codes, when executed by the processor or controller, cause the functions/operations specified in the flow charts and/or block diagrams to be implemented. The program codes may be completely executed on a machine, partially executed on a machine, partially executed as a separate software package on a machine and partially executed on a remote machine, or completely executed on a remote machine or server.

In the context of the present disclosure, the machine-readable medium may be a tangible medium which may contain or store a program for use by, or used in combination with, an instruction execution system, an instruction execution system apparatus, or an instruction execution system device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above.

As used in the present disclosure, the terms "machine-readable medium" and "computer-readable medium" refer to any computer program product, device, and/or apparatus (e.g., a magnetic disk, an optical disk, a memory, or a programmable logic device (PLD)) configured to provide machine instructions and/or data to a programmable processor, and include a machine-readable medium receiving machine instructions as machine-readable signal. The term "machine-readable signal" refers to any signal used to provide machine instructions and/or data to a programmable processor.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may be further configured to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and usually interact via a communication network. A relationship between the client and the server arises by virtue of computer programs that run on corresponding computers and have a client-server relationship with each other.

It should be noted that, in the description of the present disclosure, the terms "first" and "second" are only used for ease of description of different components or names, and cannot be understood as indicating or implying sequential relationship and relative importance or implicitly indicating the number of indicated technical features. Thus, a feature defined with "first" or "second" may explicitly or implicitly include at least one of the feature.

Unless otherwise defined, all technical terms and scientific terms used herein have the same meaning as commonly understood by those skilled in the technical field of the present disclosure. The terms used herein in the description of the present disclosure are only for the purpose of describing specific embodiments, and are not intended to limit the present disclosure.

It should be noted that, the specific embodiments of the present disclosure are described in detail with reference to the drawings, but should not be understood as imposing any limitation on the scope of protection of the present disclosure. Within the scope described in the claims, various alterations and modifications that can be made by those skilled in the art without making creative work are still encompassed within the scope of protection of the present disclosure.

The examples of the embodiments of the present disclosure are intended to simply illustrate the technical features of the embodiments of the present disclosure, so that those skilled in the art can intuitively understand the technical features of the embodiments of the present disclosure, which are not used to impose any improper limitation on the embodiments of the present disclosure.

Finally, it should be noted that: the above embodiments are merely used to illustrate the technical schemes of the present disclosure, instead of imposing any limitation on the technical schemes. While the present disclosure is described in detail with reference to the above embodiments, those of ordinary skills in the art should understand that: the technical schemes disclosed in the above embodiments may still be modified or a part of the technical features thereof may be replaced equivalently. These modifications or replacements are not intended to make the essence of corresponding technical schemes depart from the spirit and scope of the technical schemes of the embodiments of the present disclosure.

What is claimed is:

1. A method for constructing a map for a mower, comprising:
   acquiring a preliminary map of a work region of the mower, wherein the preliminary map comprises a plurality of target points collected by the mower;
   selecting any two adjacent target points in the preliminary map as first target points, connecting the first target points to form an initial connecting line, selecting a target point farthest from the initial connecting line as a second target point, wherein a distance between a target point and the initial connecting line is a smallest distance among distances between each point on the initial connecting line and the target point; and using connecting lines between the second target point and the first target points as to-be-processed connecting lines;
   selecting, for each of the to-be-processed connecting lines, a target point that is located between two ends of the to-be-processed connecting line and is farthest from the to-be-processed connecting line as a third target point, using, in response to a distance between the third target point and the to-be-processed connecting line being greater than a first preset threshold, connecting lines between the third target point and the target points at the two end s of the to-be-processed connecting line as new to-be-processed connecting lines, and returning to perform the operation of selecting, for each of the to-be-processed connecting lines, the target point that is located between two ends of the to-be-processed connecting line and is farthest from the to-be-processed connecting line as a third target point, until a distance between the selected third target point and the to-be-processed connecting line is less than or equal to the first preset threshold, and retaining each of the third target points whose distance from a corresponding to-be-processed connecting line is greater than the first preset threshold as a map construction target point, wherein the distance between the third target point and the to-be-processed connecting line is a smallest distance among distances between each point on the to-be-processed connecting line and the third target point; and
   constructing a boundary map of the work region of the mower based on the map construction target point, the first target points, and the second target point.

2. The method according to claim 1, wherein the acquiring the preliminary map of the work region of the mower comprises:
   controlling the mower to move along a boundary of the work region; and
   collecting current position information of the mower according to a preset frequency, to generate the preliminary map.

3. The method according to claim 1, wherein the until the distance between the selected third target point and the to-be-processed connecting line is less than or equal to the first preset threshold, and retaining each of the third target points whose distance from the corresponding to-be-processed connecting line is greater than the first preset threshold as the map construction target point further comprises:
   eliminating, in response to the distance between the third target point and the to-be-processed connecting line being less than or equal to the first preset threshold, target points except for the map construction target point, the first target points, and the second target point.

4. The method according to claim 1, wherein the method further comprises: sending the boundary map of the work region to a cloud server for storage.

5. The method according to claim 2, wherein the controlling the mower to move along the boundary of the work region comprises:
   determining the boundary of the work region according to a body sensor of the mower; and
   controlling the mower to move according to the boundary of the work region.

6. A mower, comprising:
   a body, a cutterhead, and a driving wheel;
   one or more processors; and
   a memory storing a program;
   wherein the program comprises instructions, and the instructions, when executed by the processor, cause the processor to perform operations of:
   acquiring a preliminary map of a work region of a mower, wherein the preliminary map comprises a plurality of target points collected by the mower;
   selecting any two adjacent target points in the preliminary map as first target points, connecting the first target points to form an initial connecting line, selecting a target point farthest from the initial connecting line as a second target point, wherein a distance between a target point and the initial connecting line is a smallest distance among distances between each point on the initial connecting line and the target point, and using connecting lines between the second target point and the first target points as to-be-processed connecting lines;
   selecting, for each of the to-be-processed connecting lines, a target point that is located between two ends of the to-be-processed connecting line and is farthest from the to-be-processed connecting line as a third target point, using, in response to a distance between the third target point and the to-be-processed connecting line being greater than a first preset threshold, connecting lines between the third target point and the target points at the two ends of the to-be-processed connecting line as new to-be-processed connecting lines, returning to perform the operation of selecting, for each of the to-be-processed connecting lines, the target point that is located between two ends of the to-be-processed connecting line and is farthest from the to-be-processed connecting line as a third target point, until a distance between the selected third target point and the to-be-processed connecting line is less than or equal to the first preset threshold, and retaining each of the third target points whose distance from a corresponding to-be-processed connecting line is greater than the first preset threshold as a map construction target point, wherein the distance between the third target point and the to-be-processed connecting line is a smallest distance among distances between each point on the to-be-processed connecting line and the third target point; and
   constructing a boundary map of the work region of the mower based on the map construction target point, the first target points, and the second target point.

7. The mower according to claim 6, wherein the acquiring the preliminary map of the work region of the mower comprises:
controlling the mower to move along a boundary of the work region; and
collecting current position information of the mower according to a preset frequency, to generate the preliminary map.

8. The mower according to claim 6, wherein the until the distance between the selected third target point and the to-be-processed connecting line is less than or equal to the first preset threshold, and retaining each of the third target points whose distance from the corresponding to-be-processed connecting line is greater than the first preset threshold as the map construction target point further comprises:
eliminating, in response to the distance between the third target point and the to-be-processed connecting line being less than or equal to the first preset threshold, the target points except for the map construction target point, the first target points, and the second target point.

9. The mower according to claim 6, wherein the instructions, when executed by the processor, cause the processor to further perform an operation of: sending the boundary map of the work region to a cloud server for storage.

10. The mower according to claim 7, wherein controlling the mower to move along the boundary of the work region comprises:
determining the boundary of the work region according to a body sensor of the mower; and
controlling the mower to move according to the boundary of the work region.

11. A mobile terminal, comprising:
one or more processors; and a memory storing a program; wherein
the mobile terminal receives a preliminary map of a work region of a mower, and the program, when executed by the processor, causes the processor to perform the method according to claim 1, construct a boundary map of the work region of the mower; and send the boundary map of the work region to the mower.

12. The mobile terminal according to claim 11, wherein the acquiring the preliminary map of the work region of the mower comprises:
controlling the mower to move along a boundary of the work region; and
collecting current position information of the mower according to a preset frequency, to generate the preliminary map.

13. The mobile terminal according to claim 11, wherein the until the distance between the selected third target point and the to-be-processed connecting line is less than or equal to the first preset threshold, and retaining each of the third target points whose distance from the corresponding to-be-processed connecting line is greater than the first preset threshold as the map construction target point further comprises:
eliminating, in response to the distance between the third target point and the to-be-processed connecting line being less than or equal to the first preset threshold, target points except for the map construction target point, the first target points, and the second target point.

14. The mobile terminal according to claim 11, wherein the program, when executed by the processor, cause the processor to perform an operation of: sending the boundary map of the work region to a cloud server for storage.

15. The mobile terminal according to claim 12, wherein the controlling the mower to move along the boundary of the work region comprises:
determining the boundary of the work region according to a body sensor of the mower; and
controlling the mower to move according to the boundary of the work region.

16. A non-transitory computer-readable storage medium storing computer instructions, wherein the computer instructions are configured for causing a computer to perform operations of:
acquiring a preliminary map of a work region of a mower, wherein the preliminary map comprises a plurality of target points collected by the mower;
selecting any two adjacent target points in the preliminary map as first target points, connecting the first target points to form an initial connecting line, selecting a target point farthest from the initial connecting line as a second target point, wherein a distance between a target point and the initial connecting line is a smallest distance among distances between each point on the initial connecting line and the target point, and using connecting lines between the second target point and the first target points as to-be-processed connecting lines;
selecting, for each of the to-be-processed connecting lines, a target point is located between two ends of the to-be-processed connecting line and is farthest from the to-be-processed connecting line as a third target point, using, in response to a distance between the third target point and the to-be-processed connecting line being greater than a first preset threshold, connecting lines between the third target point and the target points at the two ends of the to-be-processed connecting line as new to-be-processed connecting lines, and returning to perform the operation of selecting, for each of the to-be-processed connecting lines, the target point that is located between two ends of the to-be-processed connecting line and is farthest from the to-be-processed connecting line as a third target point, until a distance between the selected third target point and the to-be-processed connecting line is less than or equal to the first preset threshold, and retaining each of the third target points whose distance from a corresponding to-be-processed connecting line is greater than the first preset threshold as a map construction target point, wherein the distance between the third target point and the to-be-processed connecting line is a smallest distance among distances between each point on the to-be-processed connecting line and the third target point; and
constructing a boundary map of the work region of the mower based on the map construction target point, the first target points, and the second target point.

17. The non-transitory computer-readable storage medium according to claim 16, wherein the acquiring the preliminary map of the work region of the mower comprises:
controlling the mower to move along a boundary of the work region; and
collecting current position information of the mower according to a preset frequency, to generate the preliminary map.

18. The non-transitory computer-readable storage medium according to claim 16, wherein the until the distance between the selected third target point and the to-be-processed connecting line is less than or equal to the first preset threshold, and retaining each of the third target points whose distance from the corresponding to-be-processed connecting line is greater than the first preset threshold as the map construction target point further comprises:

eliminating, in response to the distance between the third target point and the to-be-processed connecting line being less than or equal to the first preset threshold, the target points except for the map construction target point, the first target points, and the second target point.

19. The non-transitory computer-readable storage medium according to claim 16, wherein the computer instructions are configured for causing a computer to perform an operation of: sending the boundary map of the work region to a mobile terminal or a cloud server for storage.

20. The non-transitory computer-readable storage medium of claim 17, wherein the controlling the mower to move along the boundary of the work region comprises:

determining the boundary of the work region according to a body sensor of the mower; and controlling the mower to move according to the boundary of the work region.

\* \* \* \* \*